United States Patent [19]

Hayamizu

[11] Patent Number: 4,803,499

[45] Date of Patent: Feb. 7, 1989

[54] MOVEABLE INK JET THERMAL PRINTING HEAD

[75] Inventor: Mamoru Hayamizu, Chiba, Japan

[73] Assignee: Soartec Corp, Minato, Japan

[21] Appl. No.: 15,902

[22] Filed: Feb. 18, 1987

[30] Foreign Application Priority Data

Feb. 27, 1986 [JP] Japan .................. 61-40330
Jul. 15, 1986 [JP] Japan .................. 61-164732

[51] Int. Cl.[4] .................. G01D 15/16
[52] U.S. Cl. .................. 346/140 R
[58] Field of Search .................. 346/140

[56] References Cited

U.S. PATENT DOCUMENTS 4,314,259 2/1982 Cairns .................. 346/75
4,317,124 2/1982 Shirato .................. 346/140
4,490,728 12/1984 Vaught .................. 346/140 X
4,599,628 7/1986 Doring .................. 346/140
4,611,219 9/1986 Sugitani .................. 346/140

*Primary Examiner*—Joseph W. Hartary
*Attorney, Agent, or Firm*—Cislo & Thomas

[57] ABSTRACT

A thermal ink jet printing head is disclosed in which ink is fed from a reservoir to a recessed formation defined between two plates. The two plates are moveable with respect to each other. Between the two plates and connected with the recessed formation are a plurality of grooves corresponding to a number of adjacent dot elements. There are more grooves than dot elements, and ink resides within the grooves. Therefore, electrical signals sent to the dot elements cause heating of the thermal dots which cause the ink within the grooves to bubble and spray out of the grooves to a printing surface.

3 Claims, 9 Drawing Sheets

MOVEABLE INK JET THERMAL PRINTING HEAD

BACKGROUND OF THE INVENTION

This invention relates to an ink jet printing head, particularly to eliminate the problem of ink blockage in thermal ink jet type printing machines.

Conventional type printing machines may be of the impact type or the non-impact type, wherein the non-impact type may be an electronic photograph system, an electro-static system, a thermal system or an ink jet system. However, in regard to these systems, the ink jet system is very silent, is of low power consumption and of small physical size; however, a broad use of said ink jet systems has not been realised. A main reason of the non use of ink jet systems is based on the problem of ink jet nozzle blockage. Therefore, the composition of the ink and the nozzle shape have been deeply researched and developed, but have not been sufficient to make the use of ink jet systems free of this problem, thus sufficient reliability is not obtained.

U.S. Pat. No. 4,608,577 discloses a new type of ink jet printer using a film having a plurality of holes or recesses through which the ink passes. However, it is very difficult to densely print by a plurality of holes in the film, since the film is floated by the bubble pressure when the ink is jetted by the heat of the thermal head over a short span of time. Resulting in not obtained the print in a sufficient density. Further, other prior art know to the Applicant include U.S. Pat. Nos: 3,747,120; 4,263,601; 4,308,547; 4,312,009; 4,337,467; 4,366,487; and, 4,515,487.

SUMMARY OF THE INVENTION

It is an object of the present invention to provide a highly effective means for obviating the above described disadvantages. For achieving the object, the present invention provides an ink jet printer comprising a thermal head having a plurlity of thermal dot element, a guide member having many grooves which are contacted with said thermal head, a plurality of grooves correspond to one thermal dot element, an ink supplying means for supplying an ink into said grooves, whereby said thermal and guide member are relatively movably assembled.

DESCRIPTION OF THE PREFERRED EMBODIMENTS

Figure 1:
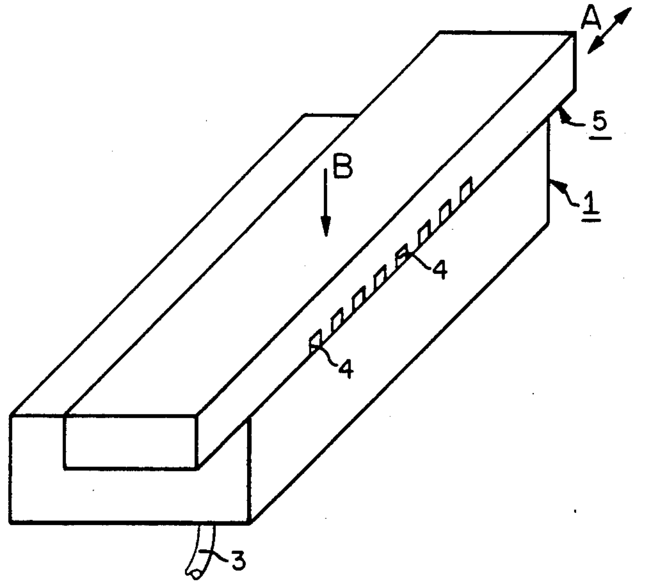
FIG. 1 shows a perspective view of the invention.
Figure 2:
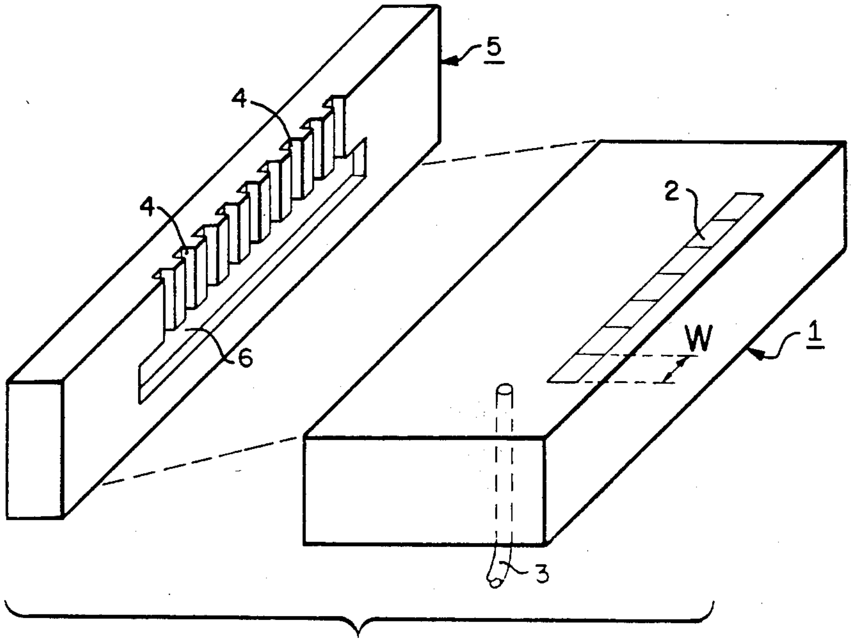
FIG. 2 shows a separated perspective view of FIG. 1.
Figure 3:
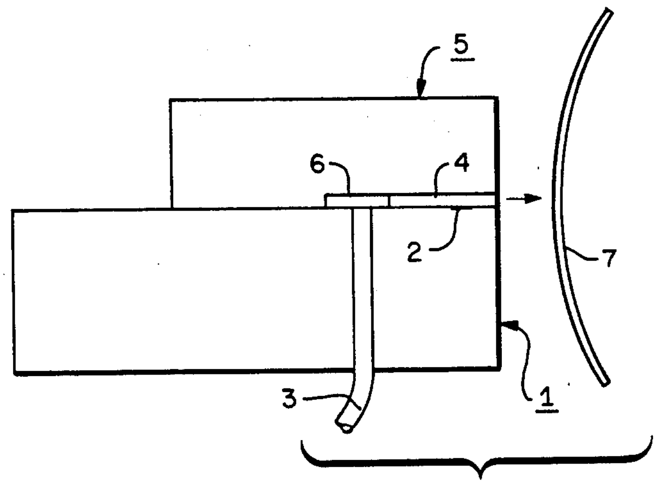
FIG. 3 shows a side view of FIG. 1.

Reference is now made to the accompanying drawings showing certain preferred embodiment of the present invention. Element number 1 represents a thermal head having many thermal dot elements 2, an ink supplying pipe 3 which is connected to an outer ink tank (not shown) and is mounted into said thermal head 1.

A guide member 5 in which many grooves 4 (forms a nozzle for the ink) corresponding to said thermal dot elements 2 is slidably mounted along the axis indicated by arrow mark A and is pressed along the axis indicated by arrow mark B.

Each of the grooves 4 do not completely correspond to thermal dot elements 2 by 1:1 ratio. A pitch between each groove 4 may be 0.03 mm having a width of each thermal dot element 2 as 0.08 mm, as one example. Thus, there are a greater number of grooves 4 than thermal dot elements 2 in order to ensure correspondence between at least one groove 4 and a thermal dot element 2 during operation.

Further, an ink gathering portion 6 is formed in the guide member and is connected with each of the grooves 4 and is formed by a recessed formation, and further connected to the ink supplying pipe 3.

The construction of the ink jet printing head of the present invention hereinafter is constructed as above described.

Each of the grooves 4 and the thermal dot elements 2 are made as one body by coupling the guide member 5 to the thermal head 1, whereby each of the grooves 4 become a nozzle having a jet function.

Therefore, when a driving pulse (not shown) is applied to said thermal dot elements 2 by a digital coded signal, a plurality of bubbles are generated in the grooves 4 which correspond to the thermal dot elements 2, whereby it is able to print a preferable printing operation by jetting ink from grooves 4 towards recording paper 7 by the bubbles formed in the groove.

Figure 4:
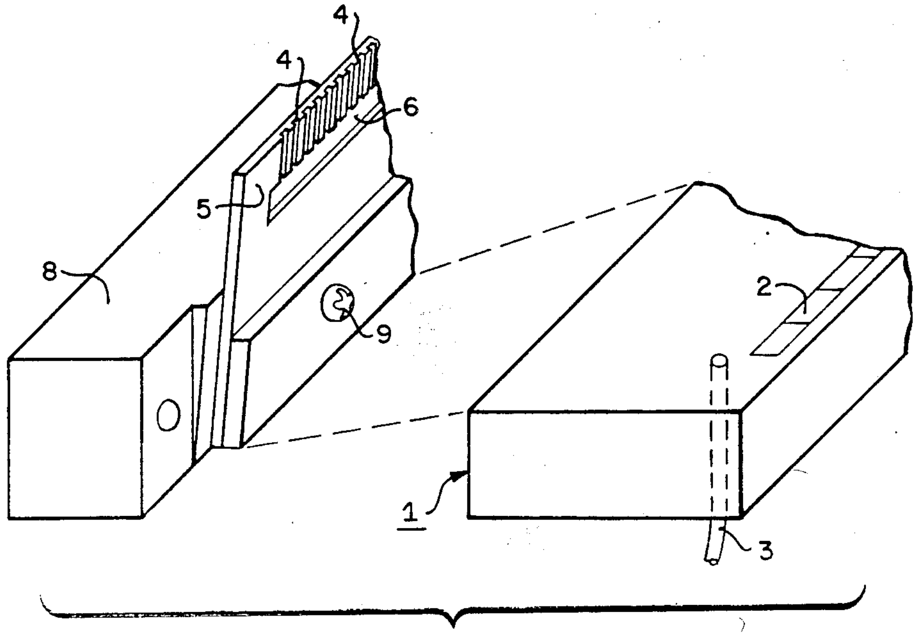
FIG. 4 shows another embodiment of the present invention.
Figure 5:
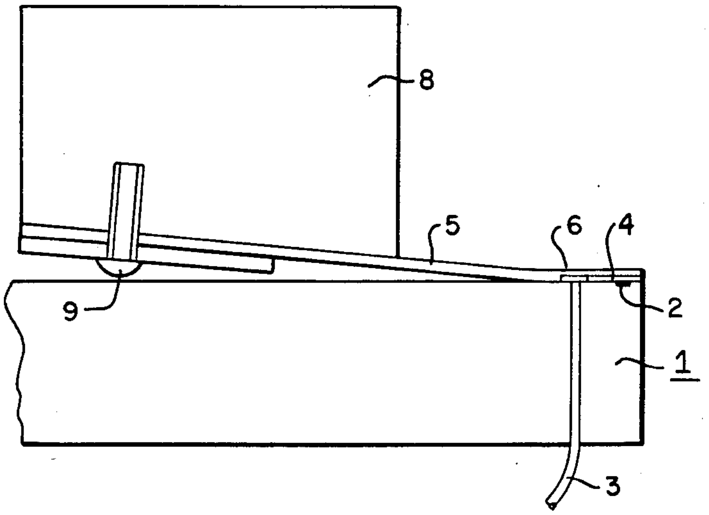
FIG. 5 shows a side view of FIG. 4.

Further, FIGS. 4 and 5 show another embodiment of the present invention. The guide member 5 is made of a resilient material such as a metal plate, and the grooves 4 are formed by an etching means. One end portion of the guide member 5 is fixed to a supporting member 8. Guide member 5 is pressed into contact with the thermal head 1 by a spring force when guide member 5 is joined with the thermal head 1 to form one body, whereby the grooves 4 are strongly contacted with said thermal dot elements 2. The further description of those elements in alternative embodiments whose function and structure is not changed from that previously described, will be omitted and these elements will be referenced by the same numerals as described in the aforementioned construction. Furthermore, the endmost portion of the grooves 4 and the corresponding endmost portion of the thermal head 1 are aligned by a positioning pin (not shown).

Figure 6:
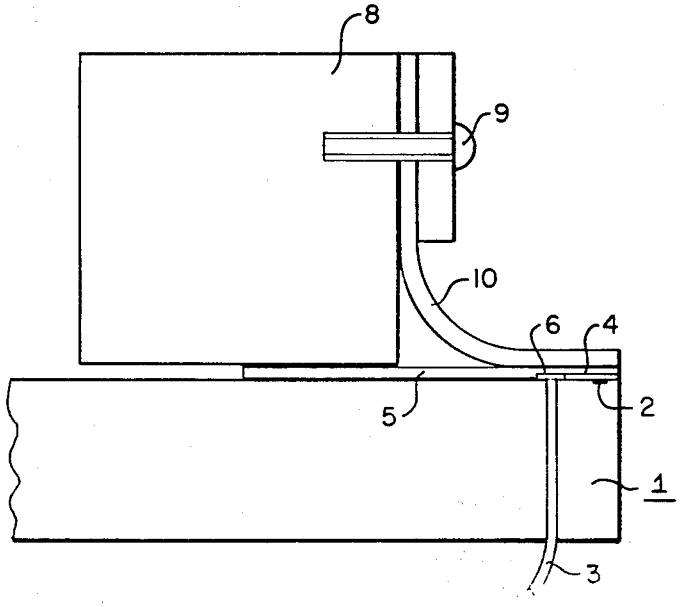
FIG. 6 shows a side view of another embodiment.

FIG. 6 shows another embodiment of the invention, wherein the guide member 5 is formed by a flat plate mounted on the thermal head 1. A supporting member 8 having a spring plate 10 is mounted on guide member 5 by an adhesive material. The guide member 5 is sealingly contacted with the thermal head 1 by spring plate 10.

Figure 7:
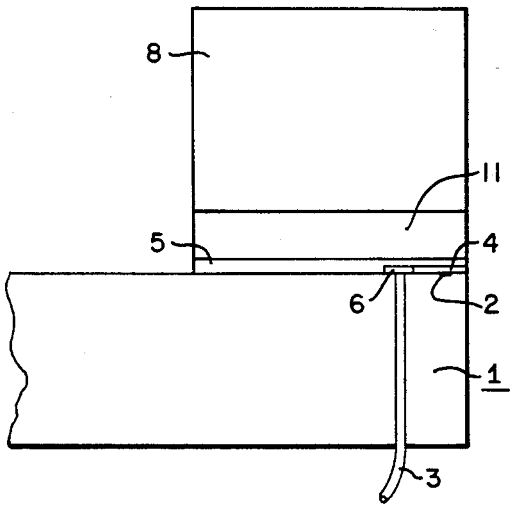
FIGS. 7 and 8 show side view of another embodiment.

FIG. 7 shows another embodiment of the invention, wherein an elastic member 11 being made of rubber, etc. is adhered under said supporting member 8. The guide member 5 is thereby strongly contacted with the thermal head 1 by means of the elastic characteristics of the elastic member 11.

Figure 8:
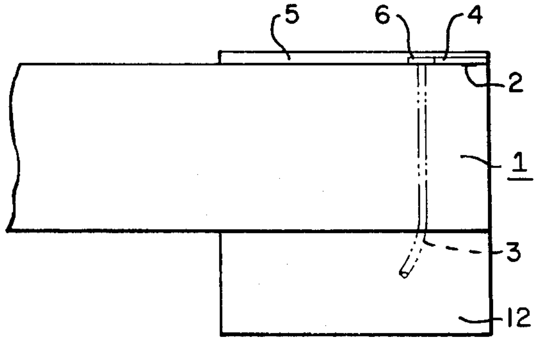

FIG. 8 shows another embodiment of the invention, wherein guide member 5 is formed of a magnetic material 12 such as metal. A magnet 12 is mounted under the thermal head 1, and the guide member 5 is thereby strongly contacted with said thermal head 1 by the magnetic force thus produced.

Figure 9:
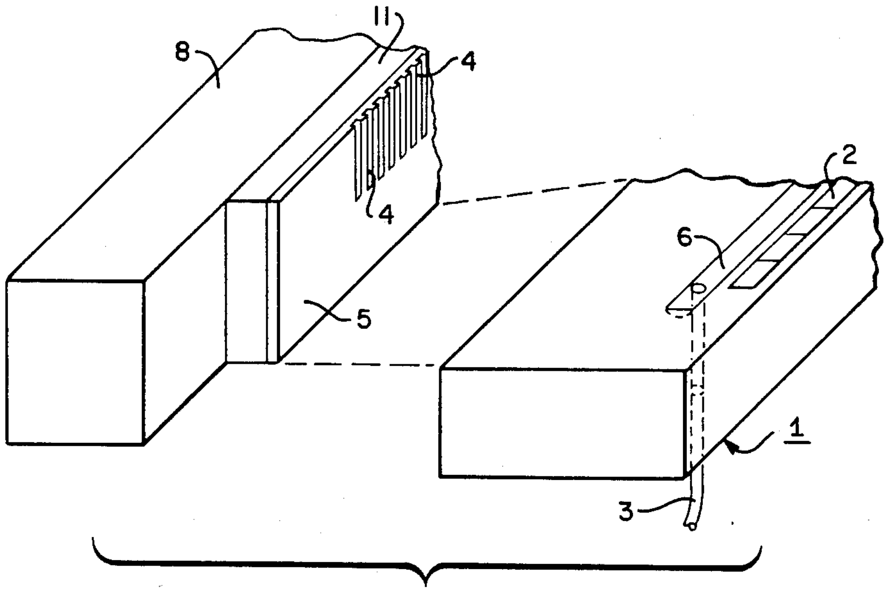
FIGS. 9 and 10 show perspective view of another embodiment.

FIG. 9 shows another embodiment of the invention, wherein the ink gathering portion 6 is formed by a recess positioned adjacent the thermal dot elements of the thermal head 1. The ink gathering portion 6 is coupled to the ink supplying pipe 3. Only the grooves 4 are formed in the guide member 5.

Figure 10:
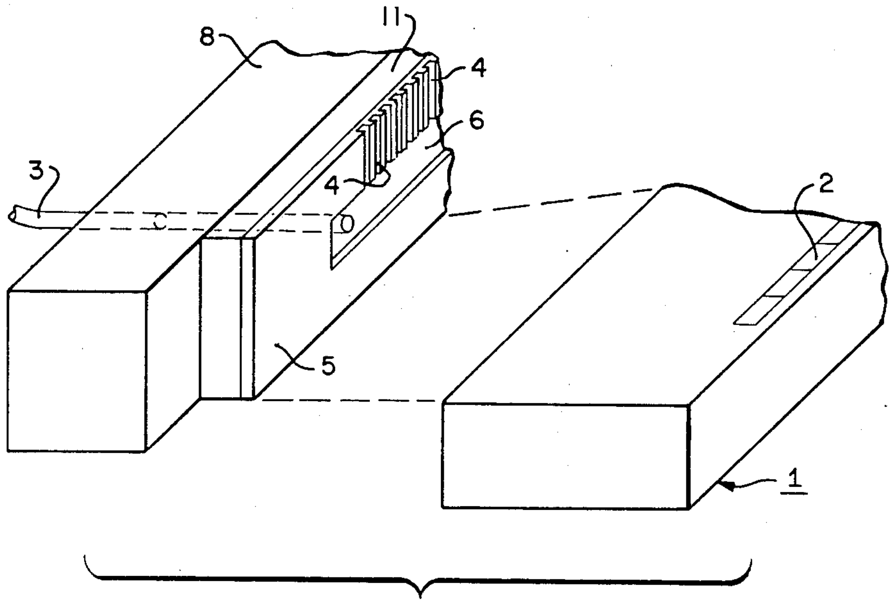

FIG. 10 shows another embodiment of the present invention, wherein the ink supplying pipe 3 is coupled to the guide member 5. The ink gathering portion 6 of guide member 5 is thereby connected with the ink supplying pipe 3.

Figure 11:
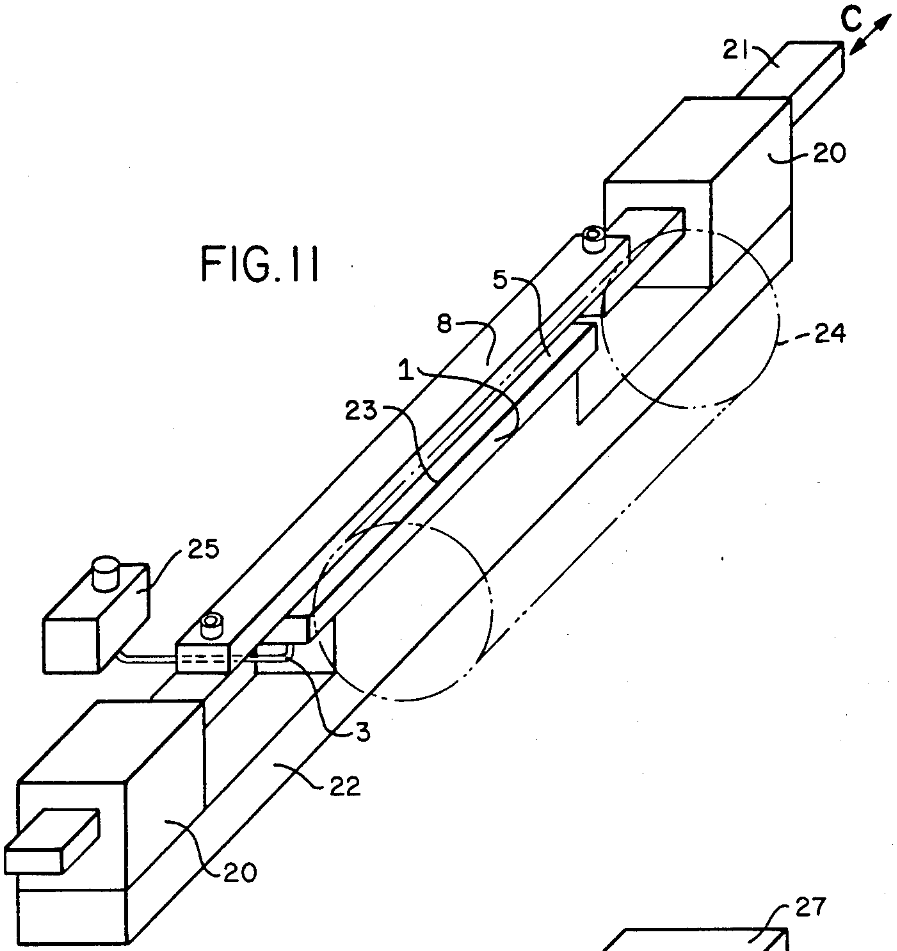
FIG. 11 shows a perspective view for a line printer.

Futher, in FIG. 11, there is shown, the construction of a line printer in which the printing head of the invention is applied thereto. In FIG. 11, numeral 20 is a bearing member, and numeral 21 is a movable axis shaft which is movable within the bearing member 20 in the direction indicated by arrow mark "C". The supporting member 8 is mounted on the movable axis shaft 21 with guide member 5 being mounted under the supporting member 8 as a single body and movable mounted with said movable axis shaft 21 in the direction indicated by arrow mark "C".

Numeral 22 is a base plate to which thermal head 1 is mounted. A platen 24 having a recording paper positioned thereon is disposed in a position in close proximity to a contact surface 23 located between the thermal head 1 and guide member 5. An ink tank 25 is connected with the ink supplying pipe 3, whereby ink is supplied to the guide member 8 by gravity.

Figure 12:
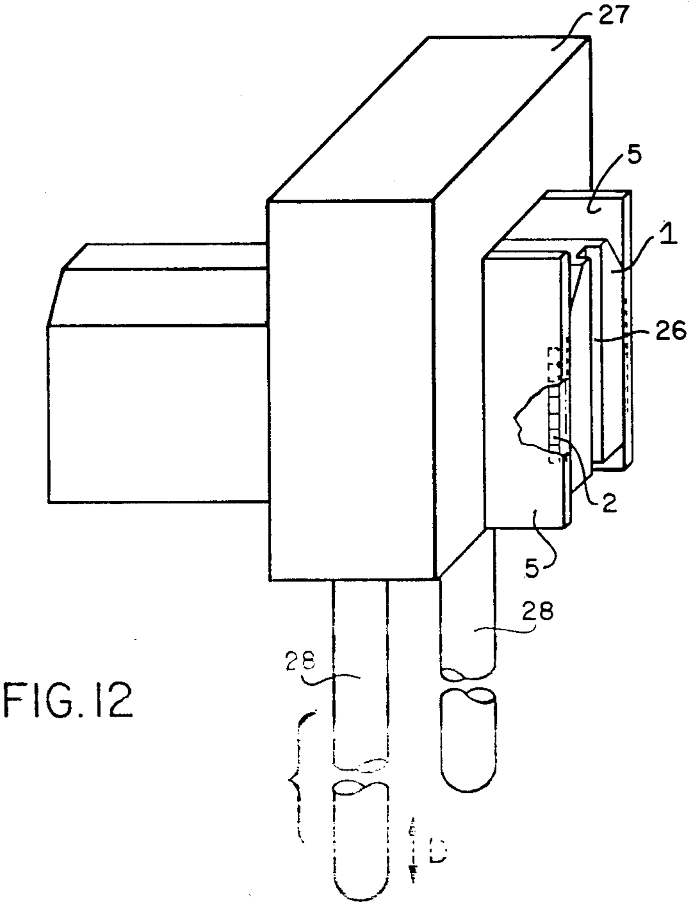
FIG. 12 shows a perspective view for a serial printer.
Figure 13:
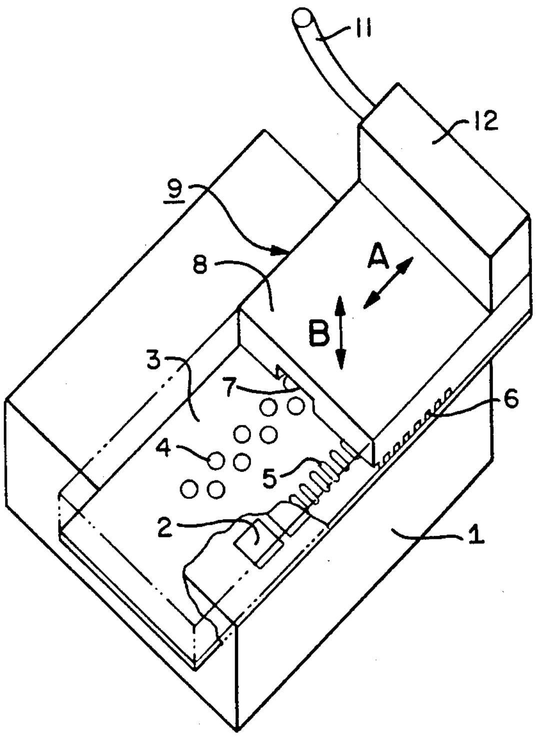
FIG. 13 shows a perspective view of the invention.
Figure 14:
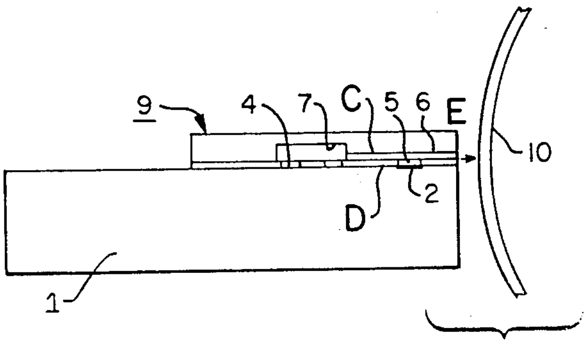
FIG. 14 shows a side view of FIG. 14.

FIG. 12 shows a printing head for a serial printer, a pair of guide members 5 are attached to opposing sides of the thermal head, which includes a pair of thermal dot elements 2. A protection groove 26 is provided for eliminating ink mixture between the two guide members and is disposed at a location intermediate the two opposing sides of the thermal head 1. These guide members 5 and thermal head 1 are supported by a U-shaped supporting member 27. Supporting member 27 is movably mounted by a pair of guide axis shafts 28 which move in a direction indicated by arrow mark "D", whereby a printing head for a two color serial printer is thus constructed.

FIGS. 13 to 19 show other embodiments of the invention: In FIGS. 13 through 19 an aperture member 30 defining a plate having a first aperture 31 and a second aperture 32 which is displaced from the first aperture 31 is mounted to the thermal head 1. The second aperture 32 being positioned over the thermal dot elements 2.

The guide member 5, having many grooves 4, is positioned on aperture member 30, with aperture member 30 and guide member 5 being coupled each to the other as one body, thus forming a nozzle member 33.

The nozzle member 33 is reciprocally slidably coupled to thermal head 1, with the first aperture 31 acting in cooperation with an ink gathering portion 6.

Therefore, there is provided a plurality of grooves 4 correspond to one thermal dot element 2. The thickness of the guide member 5 may be in the range 0.1 to 0.3 mm, with the pitch of groove 4 between 0.01 to 0.03 mm. The thickness of the aperture member 30 is 0.01 to 0.03 mm.

In the above construction, the nozzle member 33 is pressed to the thermal head 1 in the direction indicated by arrow mark "B" and is reciprocally moved in the direction indicated by the arrow mark "A". The ink in the ink gathering portion 6 is supplied to the groove 4 via the first aperture 31, paths C and D, a bubble is formed by heat produced responsive to a driving pulse being applied to the thermal dot element 2 adjacent groove 4 resulting in ink being jetted toward a recording paper 34 along arrow mark "E", an ink recording is thus obtained.

Figure 15:
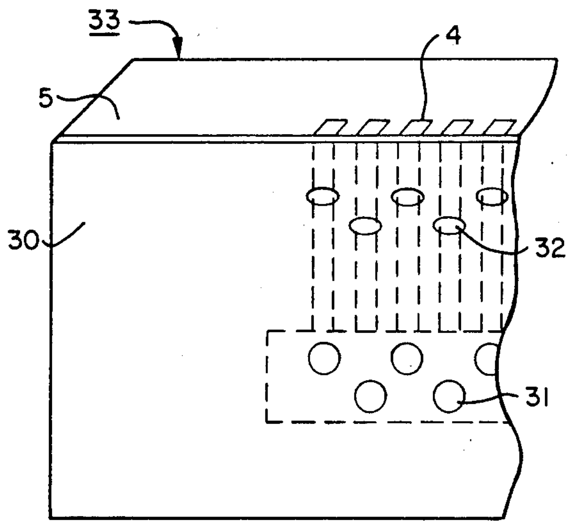
FIGS. 15 and 16 show perspective view of nozzle.
Figure 16:
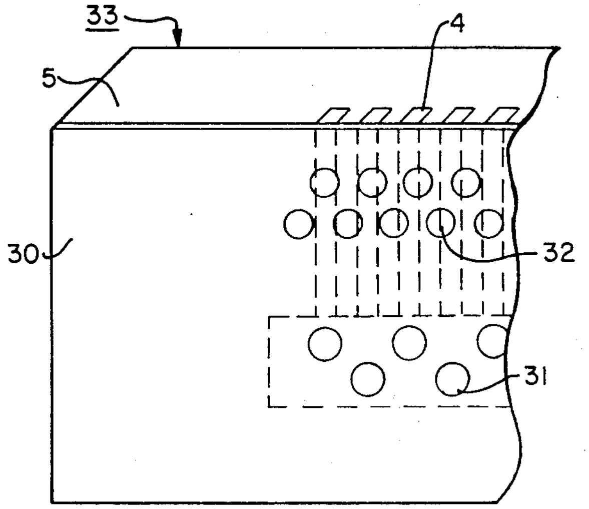

FIGS. 15 and 16 show other embodiments of the invention. FIG. 15 shows a thermal head in which the second apertures 32 correspond to the grooves 4 by a 1:1 ratio, namely it is same pitch construction. FIG. 16 shows a thermal head in which the second apertures 32 correspond to the grooves 4 by a random form, namely having different pitch construction.

Figure 17:
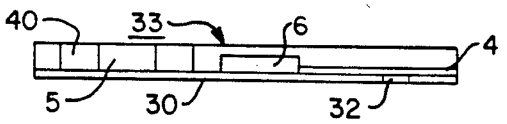
FIGS. 17 and 18 show side view of nozzle.
Figure 18:
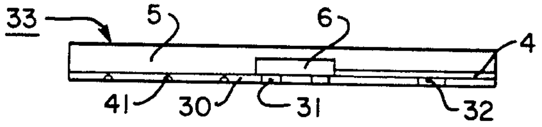

FIGS. 17 and 18 show other embodiments of the nozzle member 33. In FIG. 17, a connecting hole is formed in guide member 5, and aperture member 30 is coupled with the guide member 5 by an adhesive material. Aperture member 30 has only the second aperture 32 formed therein. Further, in FIG. 18, a recess portion 41 is formed in the aperture member 30. The recess portion 41 and aperture member 30 are formed as one body by means of a laser.

Figure 19:
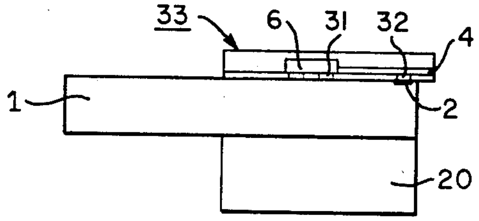
FIG. 19 shows a sectional view of another embodiment.

FIG. 19 shows another embodiment of the invention wherein a magnet 42 is positioned under the thermal head 1 for coupling the nozzle member 33 to thermal head 1, whereby the nozzle member 33 is coupled to thermal head 1 by a magnetic force.

Figure 20:
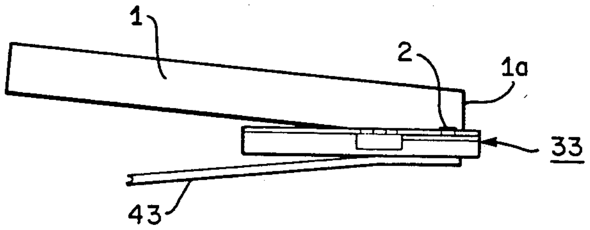
FIG. 20 shows a sectional view of another embodiment.

FIG. 20 shows another embodiment of the invention, wherein an inclined surface is formed on an endmost portion 1*a* of thermal head 1, whereby the thermal head is protected from being soiled by ink. The nozzle member 33 is pressed to thermal head 1 by an elastic plate 43.

Figure 21:
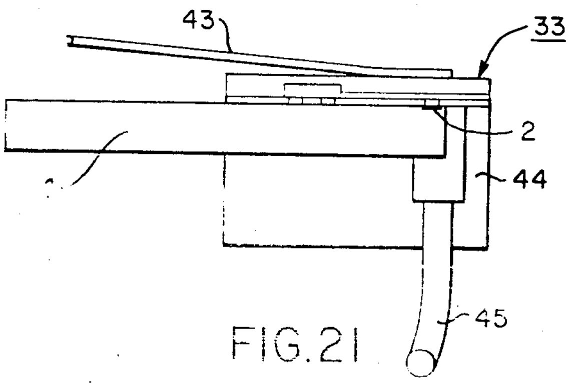
FIG. 21 shows a sectional view of another embodiment.

FIG. 21 shows another embodiment of the invention wherein a supporting member 44 for the thermal head 1 is used. A suction pipe 45 located in supporting member 44 is positioned beneath nozzle member 33. The ink is thereby sucked by a vacuum pump such that fresh ink is constantly supplied to nozzle member 33.

According to the present invention, ink blockage is eliminated in the grooves since said guide member and thermal head are movable respectively.

Further, the printing head according to the invention is able to obtain a higher recording density than the conventional type, since many grooves correspond to one thermal dot element.

Further, it is possible to obtain good ink condition without leaking since said guide member is resilient.

Further, the printing head according to the invention is easily manufactured, since the thermal head and guide member are formed from a flat plate.

What I claim is:

1. An ink jet thermal printing head for spraying ink onto a printing surface comprising:

(a) a thermal head having a plurality of thermal dot elements for creating heat, said thermal head having a recessed portion defining an ink gathering portion;

(b) a guide member slideably mounted for reciprocal movement on said thermal head so as to be in operative engagement with said thermal dot elements, said guide member defining a plurality of grooves in proximity to said thermal dot elements, said plurality of grooves being of greater number than said plurality of thermal dot elements, said reciprocal movement being in a direction substantially perpendicular to said grooves, whereby said reciprocal movement of said guide member relative to said thermal head substantially prevents said grooves from becoming blocked and for maintaining a flow of said ink during operation, wherein said guide member and said thermal printing head form channels therebetween to carry ink from said ink gathering portion of said thermal head to said thermal dot elements, wherein the ink can be heated and caused to bubble and spray the ink out of said channels and onto the printing surface; and, (c) an ink supplying means for supplying said channels with ink operatively engaged to said guide member so as to supply ink to said ink gathering portion of said thermal head.

2. An ink thermal printing head as claimed in claim 1, wherein said channels are parallel to each other.

3. An ink jet thermal printing head as claimed in claim 2, wherein said guide member is reciprocally moved to allow consistent supplying of ink to said thermal dot elements.

* * * * *